(12) United States Patent
Liang et al.

(10) Patent No.: US 6,314,147 B1
(45) Date of Patent: Nov. 6, 2001

(54) TWO-STAGE CCI/ISI REDUCTION WITH SPACE-TIME PROCESSING IN TDMA CELLULAR NETWORKS

(75) Inventors: Jen-Wei Liang, Cupertino; Arogyaswami Paulraj, Stanford, both of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/186,251

(22) Filed: Nov. 4, 1998

Related U.S. Application Data

(60) Provisional application No. 60/064,352, filed on Nov. 4, 1997.

(51) Int. Cl.[7] .................................................. H03D 1/04
(52) U.S. Cl. .......................... 375/346; 375/348; 455/63; 455/296
(58) Field of Search ................................ 375/346, 348; 455/63, 296, 501; 348/607

(56) References Cited

PUBLICATIONS

"Joint spatial and Temporal Equalization for Channels With ISI and CCI . . . " IEEE, Apr. 1997.*
"Practical Implementation of A MUltichannel Equalizer for a Propagation With ISI and CCI . . ." IEEE, Mar. 1997.*
"ISI and CCI Canceller Combining the Adaptive Array Antennas and the Viterbi Equalizer . . . " IEEE, May 1996.*
"Suppression of Adjacent Channel, Cochannel, and Intersymbol Interference by Equalizers and Linear Combiners" IEEE, Aug. 1994.*
"Joint Optimization of Spatial and Temporal Multi–user Equalization on both Transmitter and Receiver using adaptive Array antennas . . . " IEEE, May 1996.*

* cited by examiner

*Primary Examiner*—Temesghen Ghebretinsae
(74) *Attorney, Agent, or Firm*—Lumen Intellectual Property Services

(57) ABSTRACT

A two-stage, space-time digital receiver provides improved estimates of data symbols from a received signal comprising the data symbols, co-channel interference, and intersymbol interference. The first stage uses a space-time linear filter to process the received signal and provide an intermediate signal with substantially reduced co-channel interference content and substantially unaltered intersymbol interference content relative to that of the received signal. The second stage uses a Viterbi equalizer to estimate the data symbols from the intermediate signal. Because the receiver performs Viterbi equalization on the intermediate signal with reduced co-channel interference, its performance is superior to that of receivers that directly Viterbi equalize the received signal. A first embodiment of a receiver according to the present invention determines the weight coefficient matrix for the linear filter by applying MMSE criteria to the error between the intermediate signal and a reference signal derived from the convolution of known training symbols with a first set of estimated channel vectors. The first embodiment also derives a second set of estimated channel vectors from the intermediate signal for the Viterbi equalizer. A second embodiment jointly determines the coefficients for the linear filter and estimated channel vector for the Viterbi equalizer, respectively, by maximizing a single SINR objective function.

21 Claims, 9 Drawing Sheets

TWO-STAGE CCI/ISI REDUCTION WITH SPACE-TIME PROCESSING IN TDMA CELLULAR NETWORKS

This application claims priority from U.S. Provisional Patent Application 60/064,352 filed Nov. 4, 1997, which is incorporated herein by reference.

This invention was supported by the Department of the Army under contract DAAH04-95-I-0436. The U.S. Government has certain rights in the invention.

FIELD OF THE INVENTION

This invention relates to receiving an information signal in a Time Division Multiple Access cellular network, and, in particular, to a two-stage space-time digital signal processing method and apparatus for reducing both co-channel interference and intersymbol interference in a received signal to obtain the information signal.

BACKGROUND OF THE INVENTION

In recent years, the use of cellular networks for wireless communications has grown tremendously. In a cellular network, multiple wireless users within a designated area, or cell, communicate with a single base-station. In a Time Division Multiple Access (TDMA) cellular network, each user communicates with the base-station in a time-multiplexed fashion. In other words, each user is allocated a slice of time (i.e., a TDMA time slot) during which it exchanges a burst (or packet) of data with the base-station. A burst is a sequence of digital symbols representing the data. The user must then wait until the other users have exchanged their bursts of data with the base-station before exchanging its next burst of data.

The quality of communication in a cellular network, often expressed as bit-error-rate (BER), can be degraded by a variety of factors. Three important factors that degrade the quality of communication and increase BER are multipath fading, noise (e.g., thermal noise), and interference.

There are essentially two types of multipath fading. Flat fading results when the primary ray of the transmitted signal arrives at the receiver at approximately the same time as one or more reflections of the transmitted signal. If the primary ray and the reflections have different amplitudes and phases, they combine at the reciever in a manner that produces variations in the received signal strength. These variations can include drops in signal strength over several orders of magnitude. When there are a large number of reflections, as is often the case in an urban cellular network with many sources for reflection (e.g., buildings), flat fading produces a Rayleigh distribution. Time dispersion is a second type of multipath fading that occurs when the reflections arrive at the receiver delayed in time relative to one another (i.e., their propagation paths have substantially different lengths). If the relative time delays are a significant portion of a symbol period, then intersymbol interference (ISI) is produced, wherein the received signal simultaneously contains information from several superimposed symbols. Thus, both types of multipath fading can corrupt the received signal at the receiver.

In addition to multipath fading, noise, such as thermal noise in the analog front end of a receiver, can also corrupt the received signal at the receiver. Noise typically has a white frequency distribution (e.g., constant energy at all frequencies) and a gaussian temporal distribution, leading to the term additive, white, guassian noise (AWGN).

The third factor that can corrupt the received signal at the receiver is co-channel interference (CCI). CCI is the result of receiving the desired signal along with other signals which were transmitted from other radios but occupy the same frequency band as the desired signal. There are many possible sources of CCI. For example, an indirect source of CCI is adjacent channel interference (ACI). ACI is the result of side-band signal energy from radios operating at neighboring frequency bands that leaks into the desired signal's frequency band. A more direct source of CCI is signal energy from other radios operating at the same frequency band as the desired signal. For example, a cellular radio in a distant cell operating at the same frequency can contribute CCI to the received signal in the cell of interest.

All of these sources of signal corruption, but especially CCI and ISI, can significantly degrade the performance of a wireless receiver in a TDMA cellular network. Furthermore, tolerance to CCI determines the frequency reuse factor and therefore the spectral efficiency (Erlang/Hertz/Basestation) of the cellular network. Since received signals in a wireless system such as a TDMA cellular network typically comprise desired symbols as well as CCI, ISI, and noise, successful design of a wireless system requires solutions that address all these problems.

The problem of flat or Rayleigh fading can be addressd by implementing a receiver with two or more physically separated antennas and employing some form of spatial diversity combining. Spatial diversity takes advantage of the fact that the fading on the different antennas is not the same. Spatial diversity can also address interference by coherently combining the desired signal (i.e., desired symbols) from each antenna while cancelling the interfering signal (i.e., interfering symbols) from each antenna.

CCI differs from ISI in several aspects. First, the energy of CCI can be significantly lower than the energy of ISI due to larger exponential decay of the (usually) longer CCI propagation paths. This imbalance of energy causes algorithms designed to simultaneously reduce both CCI and ISI to combat ISI more than CCI. Second, in order to remove ISI, the desired user's channel impulse response must be estimated. This channel impulse response characterizes the ISI of the desired user's propagation channel. However, CCI contributes interfering, undesired symbols into the received signal. Because these interfering symbols can mask the structure of the ISI, channel estimation in the presence of CCI could be inaccurate. Third, CCI and ISI have different characteristics in the spatial and temporal domains (i.e., angles of arrival and channel impulse responses). These three differences between CCI and ISI can be utilized to separate and remove them from the desired symbols in the received signal.

The optimal theoretical solution to the CCI and ISI problems is a receiver that employs diversity combining and a multi-channel maximum-likelihood-sequence-estimator (MLSE) equalizer wherein the individual channel vectors (i.e., the discrete-time channel impulse responses) are known for all signals (i.e the desired signal and all its reflections and all the interferers). The MLSE receiver jointly demodulates both the desired and undesired signals. However, in a practical cellular network, the channels for the CCI are either unknown or can be only approximately determined. Furthermore, in certain cases CCI could have different modulation schemes and baud rates, and hence a multi-channel MLSE becomes much more complicated. Therefore, various suboptimal schemes which treat CCI as noise and focus on eliminating ISI with an equalizer have been proposed. They can be broadly classified as follows.

One class of receivers use minimum mean-square error (MMSE) criteria to provide an equalizer that reduces CCI and ISI simultaneously, such as space-only and space-time MMSE receivers. These receivers are well-known in the art and are fairly robust to CCI. However, this class of receivers implement symbol-by-symbol decision, and therefore, they are not optimal for ISI which spreads the information content of the received signal accross several symbols. Besides, they suffer from noise enhancement inherent in the MMSE approach due to channel inversion. The second class of receivers that treat CCI as noise use time-only or space-time minimum mean-square error decision feedback equalizers (MMSE/DFE). This class of receivers can perform adequately at a high signal-to-interference-plus-noise ratio (SINR). However, catastrophic error propagation can appear when the CCI is strong or when the received signals are in a deep fade. A third class of receivers that treat CCI as noise implement MLSE-based algorithms which include spatial-whitening/Viterbi and spatial-temporal-whitening/matched filter/Viterbi equalizers. The main advantage of this class of receivers is that they effectively combat ISI without producing noise enhancement or error propagation. However, the covariance matrix of the CCI must be known. All three classes of receivers described above require either accurate estimation of channel information or the covariance matrix of CCI plus noise. However, in practical situations, the presence of severe CCI impairs the accuracy of estimation of these parameters, and hence the receiver performance. It is therefore desirable to provide a digital receiver for a TDMA network which provides improved estimation of the desired symbols in a received signal that includes the desired symbols, CCI, ISI, and noise.

SUMMARY OF THE INVENTION

Accordingly, the present invention provides a method and apparatus for a TDMA digital receiver that provides improved processing of a received signal containing desired symbols, CCI, and ISI. The digital receiver according to the present invention uses a two-stage, space-time approach including a first-stage linear filter for reducing the CCI in the received signal and a second-stage Viterbi equalizer for reducing the ISI in the received signal. This receiver structure enables the second-stage Viterbi equalizer to provide accurately estimated symbols corresponding to the desired symbols in the received signal.

A first embodiment of the present invention uses a multi-input-multi-output (i.e., MIMO), space-time, linear, finite-impulse-response (i.e., FIR) filter as its first-stage linear filter. This MIMO space-time filter utilizes the differences in spatial and temporal characteristics between interferences and signals, such as different angles of arrival, fading parameters, and multipath delay profile, to effectively remove the CCI from the received signal. In order to calculate the optimal filter weight coeffcents (i.e., weight matrix, W) for the MIMO space-time filter, a training sequence is convolved with a first set of estimated channel vectors to provide a reference signal. MMSE criteria are then applied to an error term defined as the difference between the filter output and the reference signal. The filter weight coefficients are optimized jointly in the spatial and temporal domains to obtain the full benefit of both space and time diversity. The received signal is then filtered by the linear filter in accordance with the optimal filter weight coeffcents to provide a space-time intermediate signal with suppressed CCI content and substantially preserved ISI content relative to that of the received signal.

The first embodiment of the present invention uses a multi-channel, space-time Viterbi equalizer as its second-stage. A second set of estimated channel vectors is computed from the intermediate signal for the Viterbi equalizer. Because of the reduced CCI content and substantially unaltered ISI content of the intermediate signal, this second set of estimated channel vectors is more accurate than the first set of estimated channel vectors. The space-time Viterbi equalizer then uses the second set of estimated channel vectors to process the intermediate signal, substantially remove the ISI, and provide estimates of the desired symbols in the received signal. The multi-channel Viterbi equalizer's branch metric calculation captures the benefit of spatial diversity.

In a second embodiment of the present invention, a joint optimizer minimizes the influence of CCI on the estimation of the receiver parameters. The joint optimizer solves a closed-form objective function to jointly determine an optimal space-time weight vector of coefficients, $W_{opt}$, for the linear filter and an optimal effective channel vector, $h_{opt}$, for the Viterbi equalizer. The linear filter is a multi-input-single-output (i.e., MISO), space-time, linear, FIR filter, and the Viterbi equalizer is a single-channel Viterbi equalizer.

BRIEF DESCRIPTION OF THE DRAWINGS

The present invention will be described with reference to the following drawings wherein like numerals refer to like components. The drawings are provided to illustrate various aspects and embodiments of the present invention and are not intended to limit the scope of the invention.

DETAILED DESCRIPTION

In the following description, detailed explanations of well-known methods, devices, and circuits are omitted in order to avoid obscuring the description of the present invention with unnecessary details. Likewise, mathematical simplifications are taken in order to simplify the description of the method of the present invention. These mathematical simplifications are not meant to limit the applicability of the present invention to the simplified cases.

Figure 1:
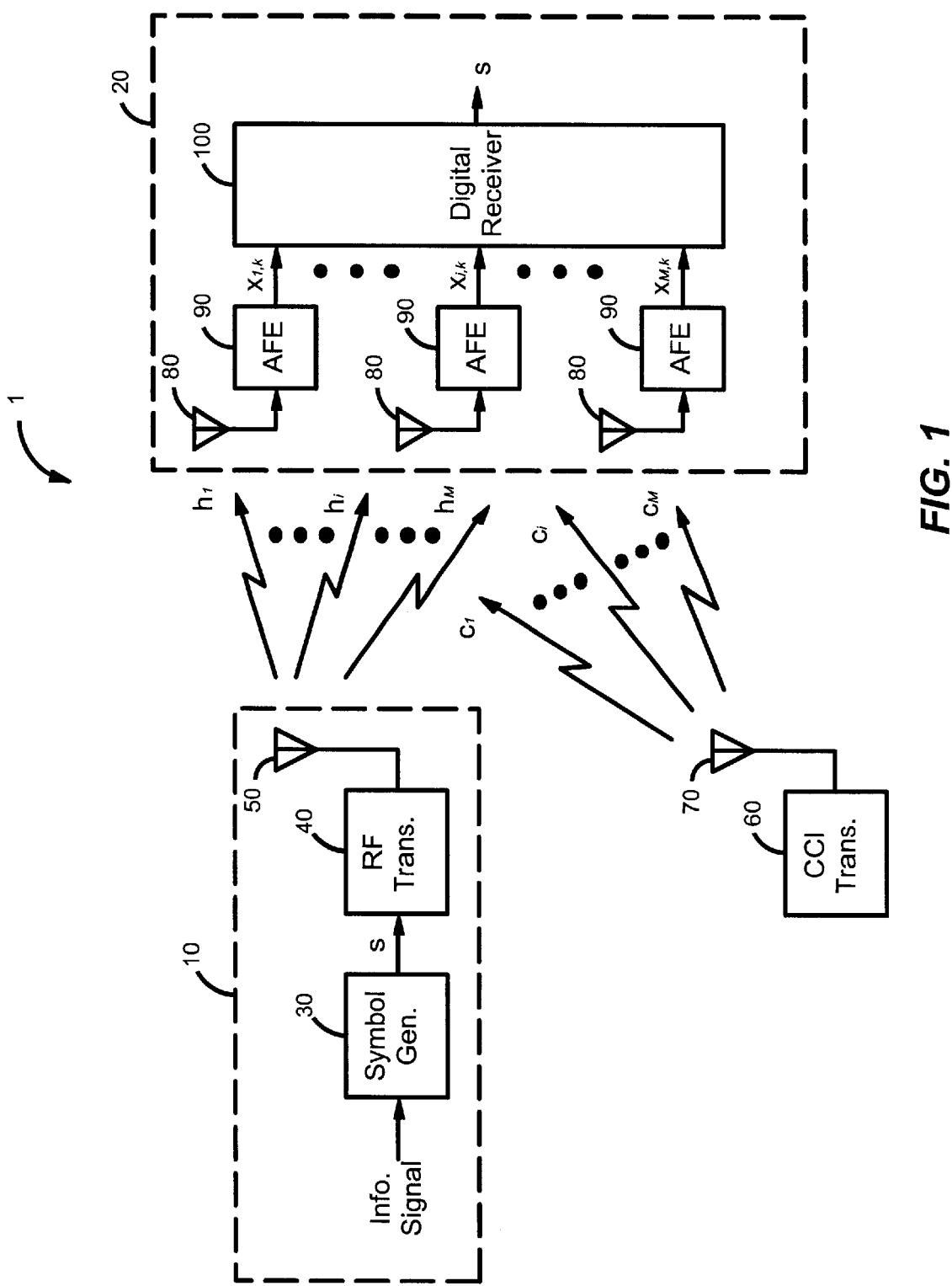
FIG. 1 is a block diagram of a TDMA cellular radio transmission and reception system incorporating M-antenna diversity reception and a digital receiver according to the present invention.

A block diagram of a radio transmission and reception system 1 for exchanging information between a single user and a base-station in a frequency-selective slow Rayleigh fading TDMA cellular network is shown in FIG. 1. System 1 includes a transmitter 10 and a wireless receiver 20 for transmitting and receiving the information, respectively. For simplicity, the description below assumes transmitter 10 is at the user and receiver 20 is at the base-station. However, this is not necessary for the present invention, and use of transmitter 10 at the base-station and receiver 20 at the user is equally valid.

Transmitter 10 has a digital symbol generator 30, as is well-known in the art, for receiving an information signal (e.g., a sequence of bits representing voice data) and generating a sequence of corresponding digital symbols, $\vec{s}$, for each TDMA time slot. The sequence, $\vec{s}$, is composed of individual data symbols, $\vec{s}$. The digital symbols are passed to an RF transmitter 40 where they undergo pulse-shaping, digital-to-analog-conversion, up-conversion, filtering, and amplification, according to methods well-known in the art, to produce an RF signal. The RF signal is transmitted from transmitter 10 via a single transmitting antenna 50. The transmitted RF signal passes through a multipath propagation channel and combines with co-channel interferers to form a cumulative RF signal at receiver 20. Co-channel interference is illustated in system 1 of FIG. 1 by co-channel transmitter 60 with transmitting antenna 70. Co-channel transmitter 60 transmits an interfereing RF signal that occupies the same frequency band as the desired RF signal from transmitting antenna 50. Co-channel transmitter 60 could be, for example, the cellular radio of another user in a distant cell of the same TDMA network. For mathematical simplicity and without loss of generality in the description and equations below, we assume only one desired user and one interferer. Furthermore, we assume that the propagation channels (both for the user and interferer) in the TDMA network are invariant within a TDMA time slot.

Receiver 20 has a plurality of spatially-separated receiving antennas 80, which are M in number, for coupling the cumulative RF signal into receiver 20 with spatial diversity. The cumulative RF signals coupled through antennas 80 then pass through respective analog front ends (AFEs) 90 where they undergo amplification, filtering, down-conversion, and analog-to-digital conversion, according to methods well-known in the art, to produce received signal samples. The received signal samples are a discrete-time representation of the received signal (i.e., the down-converted cumulative RF signal). The received signal sample for the $i^{th}$ AFE 90 at a sampling time k is designated $x_{i,k}$. For simplicity, we assume symbol rate sampling (i.e., one received signal sample from each AFE 90 is produced per symbol period), and we express the M received signal samples at each time k as an M×1 vector, $x_k=[x_{1,k} \ldots x_{M,k}]^T$. Note that the term vector will be used to refer to column vectors only (i.e., N×1 matricies, where N is a positive integer). Assuming the length of the desired user's channel impulse response is v+1 samples long, the desired user's channel vector at the output of the $i^{th}$ AFE 90 is given by $h_i=[h_{i,0} \ldots h_{i,v}]^T$. Similarly, assuming the length of the interferer's channel is u+1 samples long, the interferer's channel vector at the output of the $i^{th}$ AFE 90 is given by $c_i=[c_{i,0} \ldots c_{i,u}]^T$. The received signal samples $x_k$ include additive white gaussian noise $n_k$ (e.g., from AFEs 90). Arranging the desired user's channel vectors into an M×(v+1) matrix H and the interferer's channel vectors into an M×(u+1) matrix C, the received signal samples $x_k$ are given by:

$$x_k = \begin{bmatrix} h_{1,0} & \cdots & h_{1,v} \\ \vdots & \ddots & \vdots \\ h_{M,0} & \cdots & h_{M,v} \end{bmatrix} \begin{bmatrix} s_k \\ \vdots \\ s_{k-v} \end{bmatrix} + \begin{bmatrix} c_{1,0} & \cdots & c_{1,u} \\ \vdots & \ddots & \vdots \\ c_{M,0} & \cdots & c_{M,u} \end{bmatrix} \begin{bmatrix} z_k \\ \vdots \\ z_{k-u} \end{bmatrix} + \begin{bmatrix} n_1 \\ \vdots \\ n_M \end{bmatrix} \quad (1)$$

$$= H \cdot s_k + C \cdot z_k + n_k.$$

In equation (1), $s_k$ and $z_k$ designate the desired digital data symbols and the undesired interference (i.e., CCI) symbols at time k, respectively, and $s_k$ and $z_k$ are (v+1)×1 and (u+1)×1 vectors of the past v+1 and u+1 data and interference symbols, respectively. For simplicity, $s_k$ and $z_k$ are assumed to be binary with probabilistic expected values given by $$E(s_k s_k^*) = \sigma_s^2 \text{ and } E(z_k z_k^*) = \sigma_z^2.$$

For reference, $(\bullet)^*$ denotes complex conjugate; $(\bullet)^T$ denotes transpose; and $(\bullet)^H$ denotes Hermitian.

Equation (1) can be extended to a space-time data model (i.e., M antennas for spatial diversity and L+1 time taps for temporal diversity) by vertically stacking L+1 taps of $x_k$'s into an $$M(L+1)\times 1 \text{ vector } \bar{x}_k = [x_k^T \cdots x_{k-L}^T]^T.$$

The space-time data model is then given by:

$$\bar{x}_k = \bar{H} \cdot \bar{s}_k + \bar{C} \cdot \bar{z}_k + \bar{n}_k \quad (2)$$

where $$\bar{s}_k = [s_k \cdots s_{k-v-L}]^T, \bar{z}_k = [z_k \cdots z_{k-u-L}]^T, \bar{n}_k = [n_k^T \cdots n_{k-L}^T]^T,$$

$$\bar{H} = \begin{bmatrix} H & 0 & \cdots & 0 \\ 0 & H & & 0 \\ \vdots & & \ddots & \vdots \\ 0 & 0 & \cdots & H \end{bmatrix} \text{ and} \quad (3)$$

$$\bar{C} = \begin{bmatrix} C & 0 & \cdots & 0 \\ 0 & C & & 0 \\ \vdots & & \ddots & \vdots \\ 0 & 0 & \cdots & C \end{bmatrix}. \quad (4)$$

In equations (3) and (4), 0 are M×1 zero vectors and $\bar{H}$ and $\bar{C}$ are M(L+1)×(v+L+1) and M(L+1)×(u+L+1) block Toeplitz matricies, respectively.

The received signal samples $x_k$ from AFEs 90 are then passed to a digital receiver 100. In digital receiver 100, the received signal samples are space-time processed according to the present invention. For each symbol time k in a TDMA time slot, digital receiver 100 provides an estimated digital symbol $\tilde{s}$ which corresponds to a desired digital symbol, $\vec{s}$, originally transmitted by transmitter 10. Over an entire TDMA time slot, the individual estimated digital symbols, $\tilde{s}$, form a sequence of estimated digital symbols, $\tilde{s}$, corresponding to the sequence of transmitted digital symbols, $\vec{s}$. The estimated digital symbols, ŝ, represent the information signal sent from transmitter 10.

Figure 2:
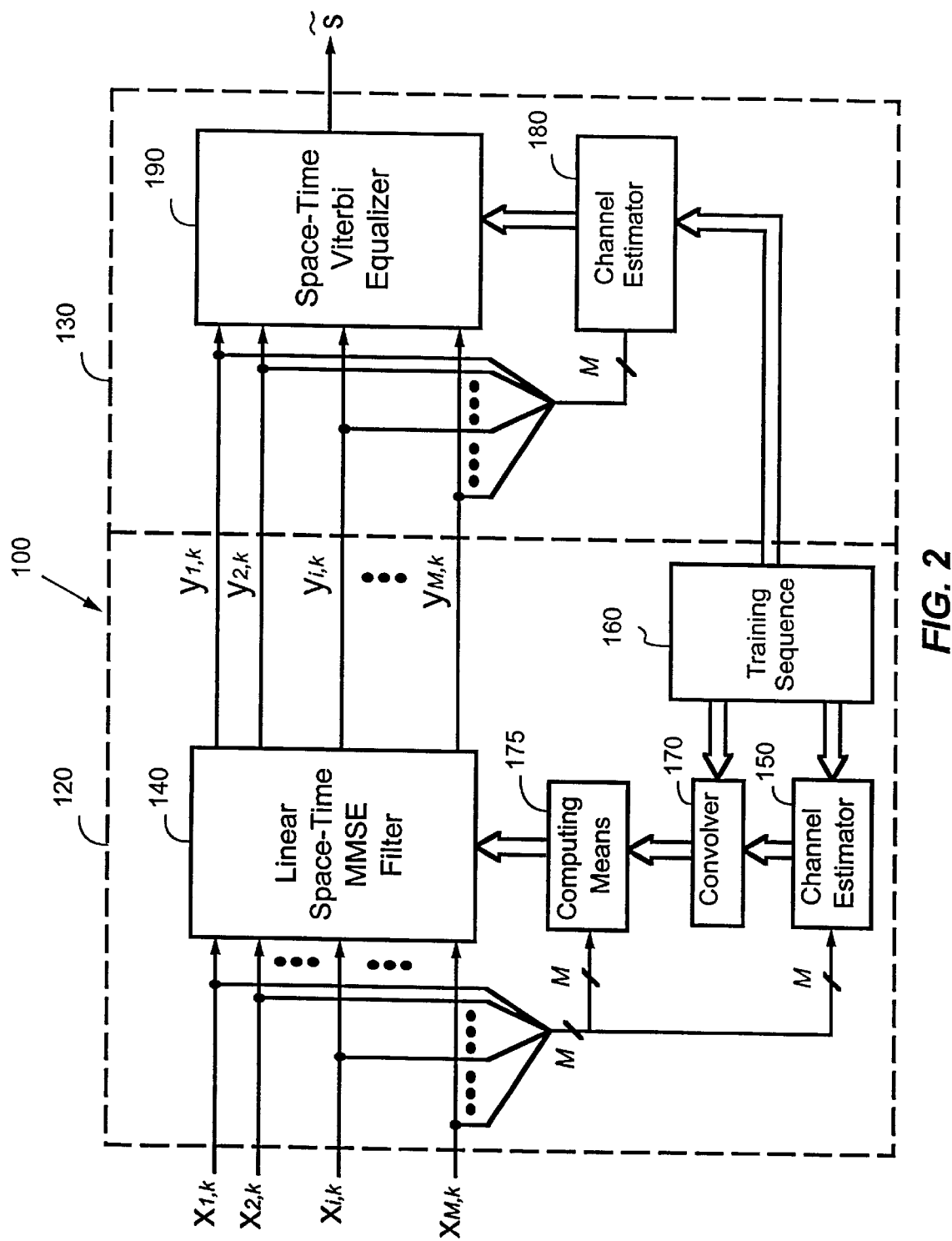
FIG. 2 is a block diagram of a two-stage digital receiver according to a first embodiment of the present invention.

A block diagram of a first embodiment of a digital receiver 100 according to the present invention is shown in FIG. 2. Digital receiver 100 comprises a CCI canceller 120 for suppressing CCI followed an ISI canceller 130 for suppressing ISI. At each time k, CCI canceller 120 processes the received signal samples $x_k$, substantially removing its CCI content to produce CCI-reduced intermediate signal samples $y_k$. Intermediate signal samples $y_k$ preserve the spatio-temporal structure of the the ISI in $x_k$. In other words, intermediate signal $y_k$ has substantially reduced CCI content and substantially equivalent ISI content relative to received signal $x_k$. ISI canceller 130 then processes $y_k$, substantially removing the ISI and producing an estimated digital symbol ŝ for each symbol period (i.e., at each time k for symbol-rate sampling).

The main component of CCI canceller 120 is a linear filter 140 that processes the received signal $x_k$ to produce intermediate signal $y_k$. Because we want to keep the spatial information intact such that ISI canceller 130 can make full use of spatial diversity, linear filter 140 is implemented as a MIMO space-time filter, typically constructed as an FIR filter as is well-known in the art. Linear filter 140 is an equalizer which performs space-time MMSE processing on the received signal $x_k$ to suppress its CCI content according the present invention. At each time k, linear filter 140 provides M output samples $y_{i,k}$ which can be expressed as the vector $y_k = [y_{1,k} \cdots y_{M,k}]^T$. Linear filter 140 has $M^2(L+1)$ filter weight coefficients, $w_{l,j}^i$, where i=1,2, . . . , M; l=1,2, . . . , M; and j=1,2, . . . , (L+1). Accordingly, the scalar signal sample $Y_{i,k}$ at the $i^{th}$ output of linear filter 140 is given by:

$$y_{i,k} = [w_{i,1}^T \; w_{i,2}^T \cdots w_{i,L+1}^T] \begin{bmatrix} x_k \\ x_{k-1} \\ \vdots \\ x_{k-L} \end{bmatrix} = w_i \cdot \bar{x}_k \quad (5)$$

where $w_{i,j}^T = [w_{1,j}^i \; w_{2,j}^i \cdots w_{M,j}^i]$ and $x_k = [x_{1,k} \cdots x_{M,k}]^T$.

Figure 3:
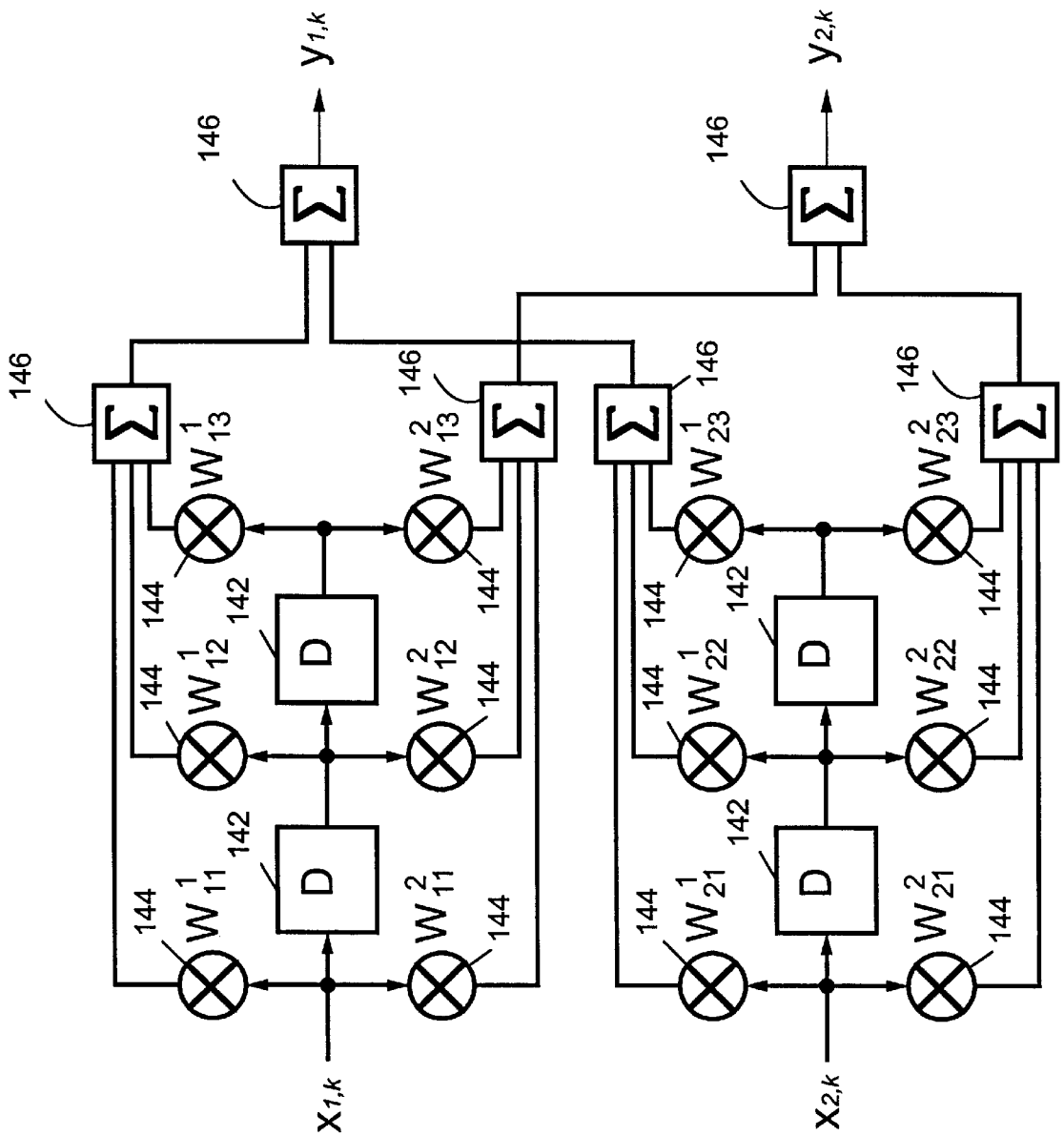
FIG. 3 is a structural block diagram of a MIMO space-time linear filter for use inside a digital receiver according to a first embodiment of the present invention.

A block diagram illustrating the general structure of a two-antenna, three time tap (i.e., M=2, L+1=3) FIR linear filter 140 is shown in FIG. 3. Linear filter 140 is comprised of ML delay elements 142, $M^2(L+1)$ multipliers 144, and M(M+1) adders 146. Each delay element 142 receives a signal sample at its input at time k−1 and reproduces the signal sample at its output at time k, delaying the sample by one symbol period. Each multiplier 144 receives a signal sample at its input and multiplies it with a weight coefficient, $w_{l,j}^i$, producing a signal sample at its output which is scaled by the weight coefficient. Each adder 146 receives a plurality of signal samples at its inputs and adds them together, producing a signal sample at its output which is the sum of the input signal samples.

CCI canceller 120 also comprises a channel estimator (i.e., a means for channel estimation) 150. Channel estimator 150 uses the received signal samples $x_k$ to provide a first set of estimated channel vectors. This first set of estimated channel vectors (or, alternatively, first channel estimate) comprises a (v+1)×1 estimated channel vector $\hat{h}_i = [\hat{h}_{i,0} \cdots \hat{h}_{i,v}]^T$ for each of the M channels corresponding to the M AFEs 90. Channel estimator 150 computes the first set of estimated channel vectors using the least squares technique, which is well-known in the art. CCI canceller 120 further comprises a storage means 160 for storing p+1 training symbols $\hat{s}_k, \hat{s}_{k-1}, \ldots, \hat{s}_{k-p}$ and a convolver (i.e., a convolving means) 170 for convolving these training symbols with the first set of estimated channel vectors from channel estimator 150. Lastly, CCI canceller 120 includes a computing means 175 for calculating the filter weight coefficients according to the present invention as described below.

All the elements in digital receiver 100 including delay elements 142, multipliers 144, adders 146, channel estimator 150, storage means 160, convolver 170, and computing means 175 can be implemented by many circuit and software techniques. These techniques include but are not limited to dedicated digital signal processing (DSP) firmware and programmed general purpose embedded microprocessors. These circuit techniques are well-know in the art, and the specific implementation details are not relevant to the present invention. In fact, the entire digital receiver 100 could be implemented as an algorithm for running on a general purpose microprocessor. In such an implementation, physical distinctions between the elements of digital receiver 100 such as the multipliers 144, adders 146 and computing means 175 are not meaningful except to identify specific operations performed by the microprocessor according to the method of the present invention. Additionally, the details of how the values for the training symbols are obtained is not relevant to the present invention. For example, the values of the training symbols may be permanently stored in storage means 160 (i.e., storage means 160 can be implemented as a read only memory). Alternatively, the values of the training symbols may be retrieved or calculated and saved into storage means 160 during system operation.

Using the training symbols, let $e_i$ represent an error vector at the $i^{th}$ output of linear filter 140. The error vector $e_i$ is given by:

$$e_i^T = [w_{i,1}^T \cdots w_{i,L+1}^T] \begin{bmatrix} x_k & \cdots & x_{k-p+v} \\ x_{k-1} & \cdots & x_{k-p+v-1} \\ \vdots & \ddots & \vdots \\ x_{k-L} & \cdots & x_{k-p+v-L} \end{bmatrix} - [\hat{h}_{i,0} \cdots \hat{h}_{i,v}] \begin{bmatrix} s_k & \cdots & s_{k-p+v} \\ s_{k-1} & \cdots & s_{k-p+v-1} \\ \vdots & \ddots & \vdots \\ s_{k-v} & \cdots & s_{k-p} \end{bmatrix} \quad (6)$$

$$= w_i^T \cdot X - \hat{h}_i^T \cdot \hat{S}.$$

Applying deterministic MMSE criterion, we minimize the following cost function:

$$w_i^T = \arg\min_w \|e^i\|^2 \quad (7)$$

$$= \hat{h}_i^T \cdot \hat{S} \cdot X^H (X \cdot X^H)^{-1}.$$

Equation (7) exists if X is a fat matrix, i.e., if p−v+1 is greater than M(L+1). CCI canceller 120 satisfies this requirement and uses computing means 175 to calculate each $w_i$ to obtain the optimal, composite M×M(L+1) space-time weight vector $W=H\hat{S}X^H(XX^H)^{-1}$ according to this criteria. Linear filter 140 uses this weight vector to provide M intermediate signal samples at its outputs at each time k given by:

$$y_k = \begin{bmatrix} w_{1,1}^T & \cdots & w_{1,L+1}^T \\ w_{2,1}^T & \cdots & w_{2,L+1}^T \\ \vdots & \ddots & \vdots \\ w_{M,1}^T & \cdots & w_{M,L+1}^T \end{bmatrix} \begin{bmatrix} x_k \\ x_{k-1} \\ \vdots \\ x_{k-L} \end{bmatrix} = \begin{bmatrix} w_1^T \\ w_2^T \\ \vdots \\ w_M^T \end{bmatrix} \cdot \bar{x}_k = W \cdot \bar{x}_k \quad (8)$$

The error vector $e_i$ used in the MMSE formulation above according to the present invention is different from the error of the conventional MMSE formulation, which uses training symbols $\hat{s}_k$ as the reference signal. For example, in a conventional single-stage, MISO space-time MMSE equalizer, the scalar error $e_k$ is given by:

$$e_k = [w_1^T \cdots w_{L+1}^T] \begin{bmatrix} x_k \\ x_{k-1} \\ \vdots \\ x_{k-L} \end{bmatrix} - \hat{s}_{k-\Delta} \quad (9)$$

where $\Delta$ is the equalizer delay. Hence, a conventional space-time MMSE filter that minimizes $E\|e_k\|^2$ simultaneously suppresses ISI and CCI. However, unlike the conventional approach that uses the training symbols as the reference signal, the present invention uses a filtered version of the training symbols (i.e., the training symbols convolved with the channel estimate) as the reference signal. Thus, this reference signal contains ISI in accordance with the first set of estimated channel vectors, and this assures that the ISI structure and content of $x_k$ is preserved in $y_k$ while CCI is suppressed.

The output signal $y_k$ from CCI canceller 120 is then passed to ISI canceller 130 as shown in FIG. 2. ISI canceller 130 comprises a channel estimator 180 and a space-time, multi-channel Viterbi equalizer 190. Channel estimator 180 provides a function much like that of channel estimator 150. It uses the CCI-reduced intermediate signal samples $y_k$ to provide a is second set of estimated channel vectors. This second set of estimated channel vectors (or, alternatively, second channel estimate) comprises a (v+1)×1 estimated channel vector $\hat{h}_i'=[\hat{h}_{i,0} \ldots \hat{h}_{i,v}]^T$ for each of the M channels corresponding to the M AFEs 90. Like channel estimator 150, channel estimator 180 computes the second set of estimated channel vectors using the least squares technique, which is well-known in the art. However, because channel estimator 180 uses the CCI-reduced signal samples y-hd k, instead of the unprocessed received signal samples $x_k$ in its least-squares estimation calculations, the second set of estimated channel vectors are much more accurate than the first set of estimated channel vectors. In other words, the CCI in $x_k$ is can mask the ISI structure of the desired user's channel, causing channel estimator 150 to compute an inaccurate first set of estimated channel vectors. However, channel estimator 180 uses $y_k$ to compute the second set of estimated channel vectors. Since $y_k$ is substantially free of CCI, the second set of estimated channel vectors will be much more accurate than the first set of estimated channel vectors. The second set of estimated channel vectors are then provided to Viterbi equalizer 190 which uses these more-accurately estimated channel vectors to process intermediate signal samples $y_k$. Viterbi equalizer 190 substantially removes the ISI from $y_k$ and provides estimated symbols ŝ at its output.

Because it determines the estimated symbols using the second set of estimated channel vectors, it can estimate the desired symbols much more accurately than prior art receivers which derive a estimated channel vectors for their Viterbi equalizers without first removing the CCI from the received signal samples. Viterbi equalizers are well-known in the art (e.g., see G. E. Bottomley and K. Jamal, "Adaptive Arrays and MLSE Equalization," 48th IEEE Vehicular Technology Conference, vol. 1, pp. 50–4, 1995.), and the details of the design of Viterbi equalizer 190 are not relevant to the present invention.

The first embodiment of the present invention was tested on a GSM scenario with GMSK modulation based on the ETSI standard. Accordingly, there were 26 training symbols $\hat{s}_k, \hat{s}_{k-1}, \hat{s}_{k+v-25}$ (i.e., p+1=26) embedded in the middle of a data burst. With a channel length of v+1 taps where (v+1) <[p+2−M(L+1)]=27−M(L+1), the corresponding received signals were $$[x_k x_{k-1} \ldots x_{k-25}] = \hat{H} \cdot S + [n_k n_{k-1} \ldots n_{k-25}] \quad (10)$$

where $$S = \begin{bmatrix} s_k & s_{k-1} & \cdots & s_{k+v-25} \\ s_{k-1} & s_{k-2} & \cdots & s_{k+v-26} \\ \vdots & \vdots & \ddots & \vdots \\ s_{k-v} & s_{k-v-1} & \cdots & s_{k-25} \end{bmatrix} \quad (11)$$

and H is the same as defined in equation (1). The color noise $n_i$ contained CCI and additive white Gaussian noise, and the least square channel estimate $\hat{H}$ from channel estimator 150 was given by:

$$\hat{H}=[\hat{h}_0 \ldots \hat{h}_v]=[x_k x_{k-1} \ldots x_{k+v-1}] \cdot S^H(S \cdot S^H)^{-1}. \quad (12)$$

The simulations used the Typical Urban, 50 km/hr mobile velocity (TU50) test model for the multipath fading and delay parameters, as is well-known in the art. Angle spreads for signals and interferers were 30 and 18 degrees, respectively. To simulate an M=2, L=1 space-time digital receiver according to the present invention, a two-antenna model was used along with a 2 time tap space-time CCI canceller 120 and a 2 time tap space-time ISI canceller 130. The signal-to-noise ratio (SNR) was set at 20 dB for the simulation.

Figure 4:
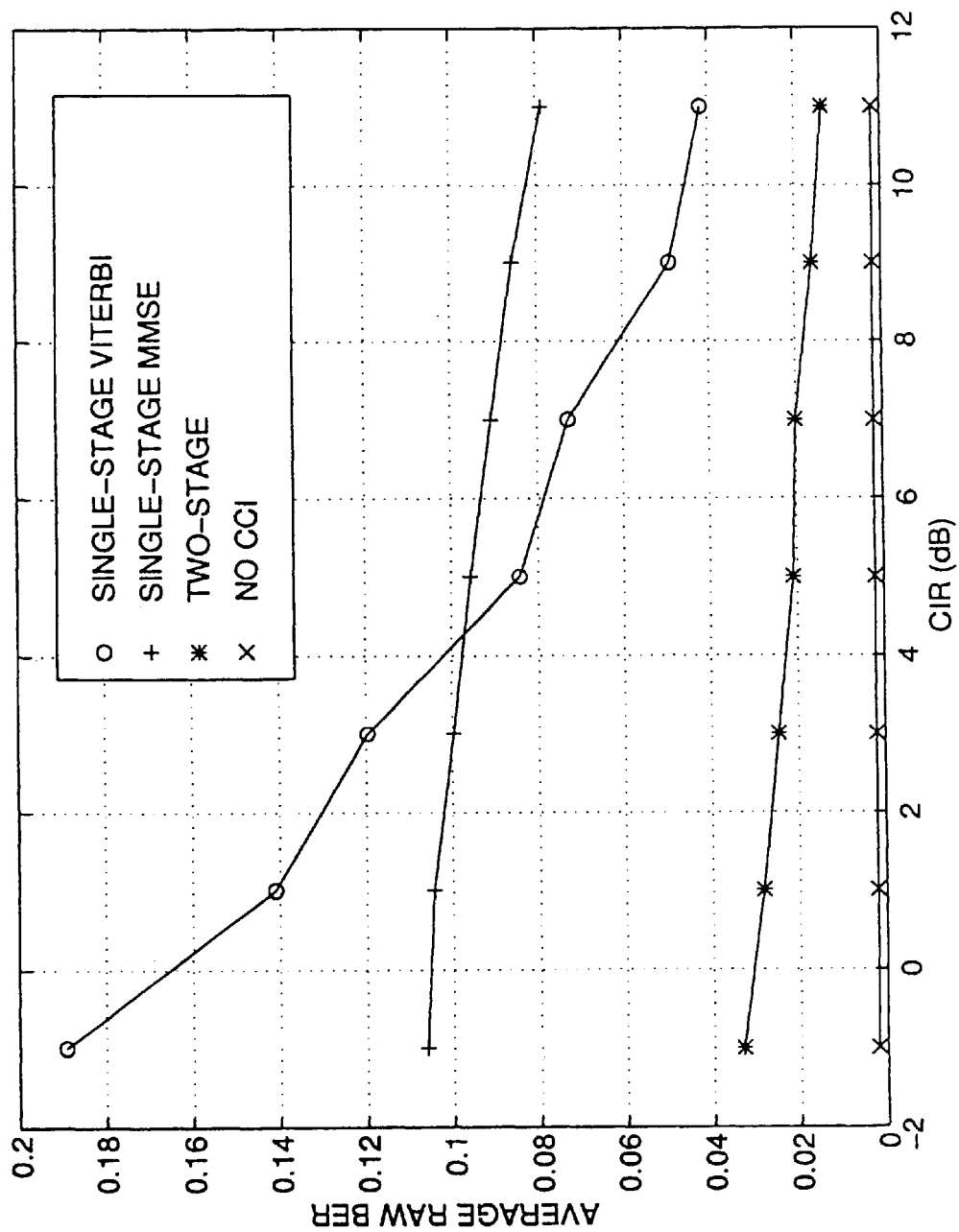
FIG. 4 is plot of the simulated raw BER performance versus carrier-to-interference-ratio for a single-stage space-time Viterbi equalizer, a single-stage MMSE linear equalizer, and a two-stage digital receiver according to a first embodiment of the present invention.

FIG. 4 plots the average raw BER performance for this simulated two-stage digital receiver according to the first embodiment of the present invention. The figure also plots the average raw BER performance of a simulated single-stage space-time Viterbi equalizer and a simulated single-stage space-time MMSE equalizer, both of which simultaneously reduce CCI and ISI. Simulations were performed under various carrier-to-interference ratios (CIR) in order to evaluate the interference cancellation capability of the three receivers. The fourth (lowest) curve in FIG. 4 plots the performance of a single-stage Viterbi equalizer in a scenario without CCI. Since a Viterbi equalizer is optimal for this no-CCI condition, the fourth curve serves as the lower bound of the BER performance. The gap between the curves of the two single-stage approaches and the no-CCI curve illustrates the performance degradation of single-stage equalizers due to the colored noise characteristics and the inaccurate channel estimate caused by CCI. FIG. 4 also demonstrates that Viterbi equalizers have better performance than MMSE equalizers when CIR is high, but MMSE equalizers are more robust when CCI is the dominant interference source. However, the two-stage digital receiver according to the first embodiment of the present invention is superior to both single-stage approaches because it suppresses CCI at the first stage and provides signals with higher CIR for the second stage. This allows the second stage to determine a more accurate channel estimated and perform better ISI equalization. FIG. 4 shows that the two-stage digital receiver according to the first embodiment of the present invention provides increased robustness to CCI and ISI compared to the single-stage approaches even at low carrier-to-interference ratios, which are common in both low frequency-reuse-factor cellular systems and fixed wireless local-loop systems.

Figure 5:
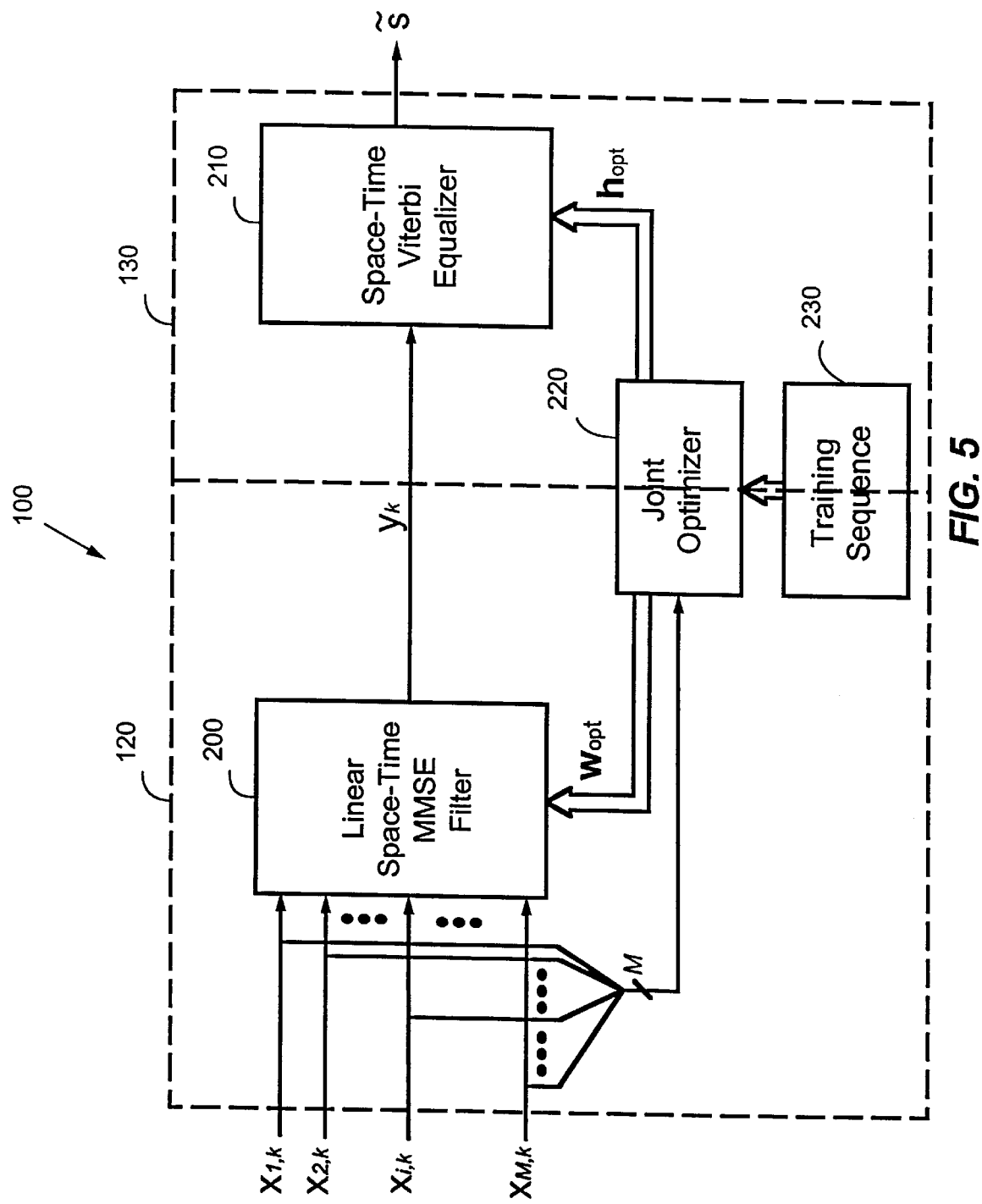
FIG. 5 is a block diagram of a two-stage digital receiver according to a second embodiment of the present invention.

The structure and operation of a second embodiment of a two-stage digital receiver 100 according to the present invention will now be discussed. Like the first embodiment, the second embodiment of digital receiver 100 comprises a CCI canceller 120 for reducing the CCI in the received signal $x_k$ to provide an intermediate signal $y_k$ with reduced CCI content and substantially preserved ISI structure. As in the first embodiment, CCI canceller 120 is followed by an ISI canceller 130 for removing the ISI from the intermediate signal and providing estimated symbols ŝ, as shown in FIG. 5.

Unlike the first embodiment of digital receiver 100, however, the second embodiment uses a hybrid approach consisting of a MISO, space-time linear filter 200 followed by a single-channel Viterbi equalizer 210. Linear filter 200 is typically constructed as an FIR filter, as is well-known in the art. A joint optimizer 220 uses the input data $x_k$ and the training sequence from a training sequence storage means 230 to jointly determine vectors $w_{opt}$ and $h_{opt}$. Vector $w_{opt}$ is the optimal vector of filter weight coefficients for MISO space-time linear filter 200, and $h_{opt}$ is the optimal effective channel vector for single-channel Viterbi equalizer 210. Linear filter 200 uses $w_{opt}$ to reduce CCI and maximize SINR. Viterbi equalizer 210 uses the effective channel vector $h_{opt}$ to equalize ISI and determine the estimated data symbols. The influence of CCI on the estimation of the receiver parameters $w_{opt}$ and $h_{opt}$ is reduced by jointly optimizing both the space-time weight vector $w_{opt}$ and the effective channel vector $h_{opt}$ by solving a single objective function. The selection of an appropriate objective function for joint optimizer 220 and a technique of determining and estimating $w_{opt}$ and $h_{opt}$ according to the present invention will now be discussed.

Suppose $\hat{s}_{k-v-L}, \ldots \hat{s}_{k+p}$ is the known training sequence. Using the space-time data model in equation (2), the corresponding received signal $\overline{X}=[\overline{x}_k \ldots \overline{X}_{k+p}]$ (including the training symbols, CCI, ISI, and noise) can be written as:

$$\overline{X} = \overline{H} \cdot \overline{S} + \overline{C} \cdot \overline{Z} + \overline{N} \quad (13)$$

where $\overline{S}$ is a toeplitz matrix with $[s_k, \ldots, s_{k-v-L}]^T$ and $[S_k, \ldots, s_{k+p}]$ as its first column and row, respectively; $\overline{N}=[\overline{n}_k \ldots \overline{n}_{k+p}]$; and $\overline{Z}$ can be constructed similarly to $\overline{S}$. Let the intermediate signal samples, y, at the output of the linear filter 200 be:

$$y^T = w^T \overline{X} = h^T \overline{S} + e^T \quad (14)$$

where w is a M(L+1)×1 vector of the coeffceints of linear filter 200, h is the effective channel vector, and $e^T = w^T\overline{X} - h^T\overline{S}$ is the error term or disturbance. Thus, the error term is a difference between the intermediate signal (i.e., $w^T\overline{X}$ is linear filter 200's output) and a reference signal containing ISI (i.e., $h^T\overline{S}$ is a reference signal formed by the convolution of the effective channel response with the training symbols). The reference signal contains an ISI structure according to h. Using the definition $\text{SINR} = \|h^T\overline{S}\|^2/\|e^T\|^2$ as the objective function, we set up the following joint optimization problem:

$$\max_{w,h} \frac{\|h^T\overline{S}\|^2}{\|w^T\overline{X} - h^T\overline{S}\|^2}. \quad (15)$$

In this joint optimization, w and h are unknown variables, $\overline{X}$ are received signals containing the known training sequence, and $\overline{S}$ is the training sequence. The technique of separation of variables, which is well known in the art, is applied to simplify the joint optimization in (15). Thus, it is straightforward to change (15) to:

$$h_{opt} = \arg\max_h \frac{\|h^T\overline{S}\|^2}{\|h^T\overline{S}(\overline{X}^H(\overline{X}\overline{X}^H)^{-1}\overline{X} - I)\|^2} \quad (16)$$

$$= \arg\max_h \frac{h^H\overline{S}*\overline{S}^T h}{h^H\overline{S}*(I - \overline{X}^H(\overline{X}\overline{X}^H)^{-1}\overline{X})*\overline{S}^T h}$$

$$= \arg\max_h \frac{h^H\overline{S}*\overline{S}^T h}{h^H\overline{S}*P_{\overline{X}^H}^{\perp *}\overline{S}^T h}.$$

Equation (16) is a generalized eigenvalue problem, and $h_{opt}$ is the eigenvector corresponding to the largest eigenvalue $\lambda_{max}$ of equation (16) scaled by a non-zero constant, and $w_{opt}$ can be calculated from:

$$w_{opt}^T = h_{opt}^T \overline{S}\overline{X}^H(\overline{X}\overline{X}^H)^{-1}. \quad (17)$$

The weight vector $w_{opt}$ is used by MISO space-time linear filter 200, and $h_{opt}$ is provided to Viterbi equalizer 210 as the effective ISI channel vector. $h_{opt}$ is jointly optimized with $w_{opt}$ in equation (15), so no estimation of $\overline{H}$ is required, as in the first embodiment of the present invention.

In this hybrid approach, we choose $W_{opt}$ and $h_{opt}$ such that CCI is minimized by $w_{opt}$ in linear filter 200. The resulting intermediate signal samples from the output of the space-time linear filter are used with the associated effective channel vector $h_{opt}$ to maximize the performance of single-channel Viterbi equalizer 210. In order to validate the objective function for the joint optimizer, we examine the pairwise error probability of the nearest neighbor, which is a dominant and important index of the overall error probability of a Viterbi equalizer. Assume M=1 (i.e., a single antenna case), FIR channel $h=[h_0 \ldots h_v]^T$ for the desired user, and FIR channel $c=[c_0 \ldots c_u]^T$ for the interferer. Both h and c are constant within a TDMA burst and have independent complex Gaussian distributions from one burst to another. A burst of the received signal $x=[x_0 \ldots x_N]^T$ can be written as:

$$x^T = h^T S + c^T Z + n^T \quad (18)$$

where S is a toeplitz matrix constructed by the data sequence $s=[s_{-v}, \ldots s_N]$ with $[s_0 \ldots s_{-v}]^T$ as its first column and $[s_0 \ldots s_N]$ as its first row; Z is also a toeplitz matrix with $[z_0 \ldots z_{-u}]^T$ as its first column and $[z_0 \ldots z_N]$ as its first row; N+1 is the length of the received burst, and n is additive white Gaussian noise. Suppose a data sequence s is transmitted. An erroneous decision is made between s and s+Δs when the decision variable D(s, Δs) is less than zero, where D(s, Δs) is defined as:

$$D(s,\Delta s) = \|x-(S+\Delta S)^T h\|^2 - \|x-S^T h\|^2 \quad (19)$$

where ΔS is a toeplitz matrix constructed by an admissible error sequence Δs. Applying the Q-function method, equation (19) simplifies to:

$$D(s,\Delta s)=\|\Delta S^T h\|^2+2Re(h^H\Delta S^*(Z^T c+n)). \quad (20)$$

Given h, c and Z, D(s, Δs) is a Gaussian random variable with mean $\|\Delta S^T h\|^2+2Re(h^H\Delta S^* Z^T c)$ and variance $4h^H \Delta S^* R_n \Delta S^T h$, where $R_n=\sigma_n^2 I$ is the covariance matrix of the real part of the thermal noise and I is the identity matrix. Therefore, the conditional pairwise error probability $P_e$ for a particular burst is:

$$P_\ominus(s, \Delta s|h, c, Z) = \int_{D<0} d_{D|h,c,Z}(D) dD \quad (21)$$

$$= Q\left(\frac{\|\Delta S^T h\|^2 + 2/Re(h^H \Delta S * Z^T c)}{2\sqrt{h^H \Delta S * R_n \Delta S^T h}}\right)$$

where Q(•) is defined as $$Q(x) = \frac{1}{\sqrt{2\pi}} \int_x^\infty \exp\left(\frac{-y^2}{2}\right) dy.$$

Averaging over all possible sequences of Z and across different bursts with respect to c, we obtain:

$$P_\ominus(s, \Delta s|h) = \frac{1}{\text{No. of } Z} \sum_{z_i} \int_c P_\ominus(s, \Delta s|h, c, Z) dc \quad (22)$$

$$= \frac{1}{\text{No. of } Z} \sum_{z_i} Q\left(\frac{\|\Delta S^T h\|^2}{2\sqrt{h^H \Delta S * (Z_i^T R_c Z_i + R_n) \Delta S^T h}}\right)$$

where $R_c$ is a diagonal matrix with $[\sigma_{c0}, \ldots, \sigma_{cu}]$ as its diagonal elements, and $\sigma^{c/2}$ is the variance of the real part of $c_i$. Equation (22) can be closely approximated by taking the expected value of Z into the square root of the denominator within the Q-function, and the approximation becomes:

$$P_\ominus(s, \Delta s|h) \approx Q\left(\frac{\|\Delta S^T h\|}{2\sqrt{\sigma_n^2 + \sigma_z^2 \sum_{i=1}^u \sigma_{ci}^2}}\right) = Q\left(\frac{\|\Delta S^T h\|}{2\sigma}\right) \quad (23)$$

where $$\sigma^2 = \sigma_n^2 + \sigma_z^2 \sum_{i=1}^u \sigma_{ci}^2,$$

which is the power of the overall disturbance. For the nearest neighbor, particularly in a GSM system, we can choose Δs to be one bit error (i.e., Δs is all zeros except for one $\pm 2\sigma_s$ in one of the elements). Therefore the square of the argument inside the Q-function becomes $\sigma_s^2\|h\|^2/\sigma^2$, or SINR, verifying that this is a reasonable objective function to be maximized, as in equation (21).

Figure 6:
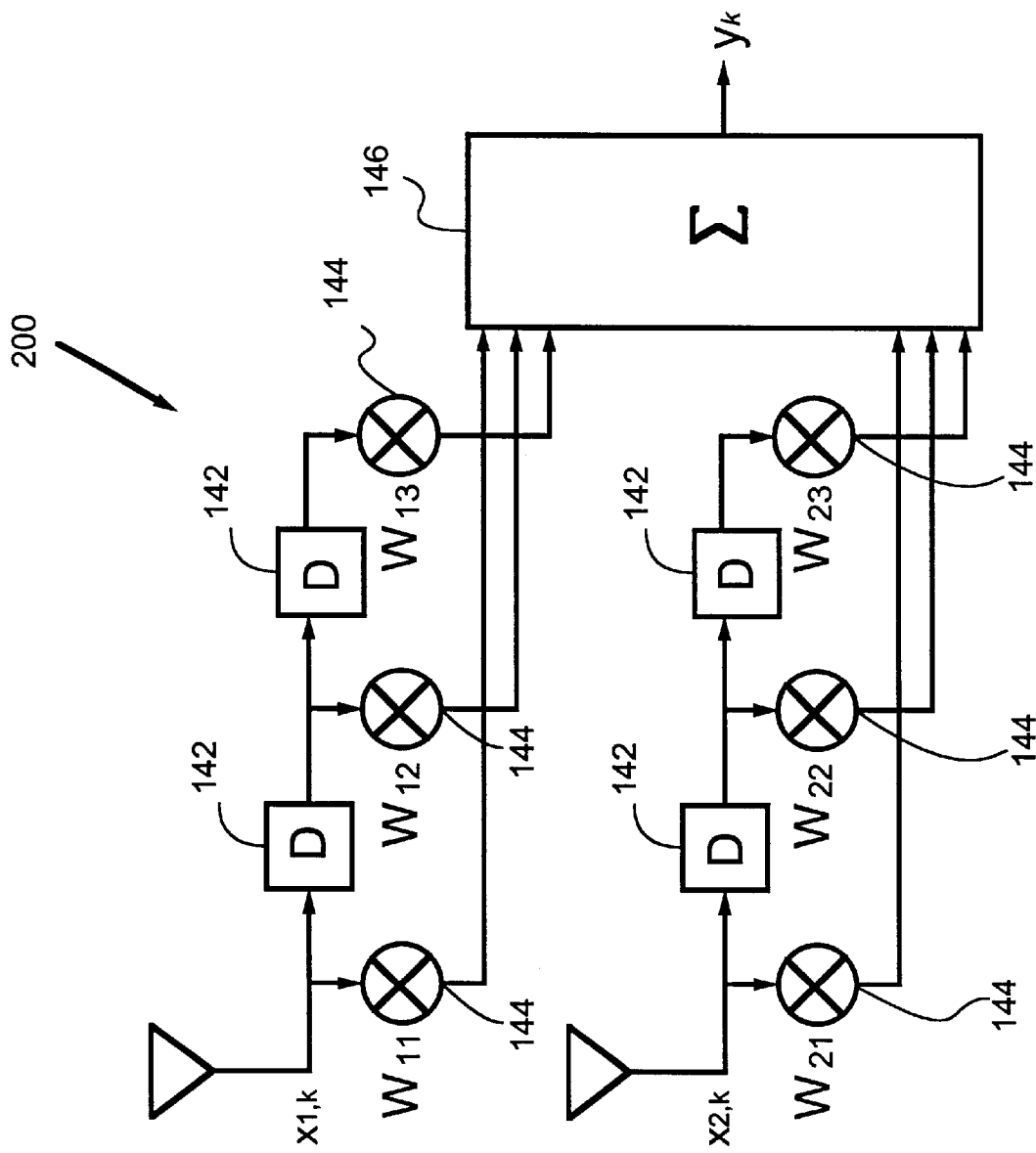
FIG. 6 is a structural block diagram of a MISO space-time linear filter for use inside a digital receiver according to a second embodiment of the present invention.

A block diagram illustrating the general structure of a two-antenna, three time tap (i.e., M=2, L+1=3) MISO space-time linear filter 200 is shown in FIG. 6. MISO space-time linear filter 200 is comprised of essentially the same types of elements as MIMO space-time linear filter 140. Specifically, MISO space-time linear filter 200 is comprised of ML delay elements 142, M(L+1) multipliers 144, and one adder 146. As for linear filter 140 of FIG. 4, the implementation of delay elements 142, multipliers 144, and adders 146 in linear filter 200 can be accomplished using many circuit and software techniques which are well-know in the art.

An third embodiment of digtial receiver 100 according to the present invention is made by combining elements of the first and second embodiments described above by replacing MISO linear filter 200 in FIG. 5 with a MIMO linear filter 140 and single-channel Viterbi equalizer 210 with a multi-channel Viterbi equalizer 190. The filter weight matrix $W_{opt}$ and the channel matrix $H_{opt}$ is then provided by a joint optimizer 220, as in the second embodiment. To evaluate whether the performance of digital receiver 100 would improve for this third embodiment relative to the second embodiment, consider the use of a MIMO space-time filter having a weight matrix W with dimension M(L +1)×M and a multi-channel Viterbi equalizer with an effective channel matrix H. The joint optimization problem can be written in a manner similar to equation (15) as:

$$\max_{W,H} \frac{\|H^T \bar{S}\|_F^2}{\|W^T \bar{X} - H^T \bar{S}\|_F^2}. \quad (24)$$

Because of the property of Frobenius norm, we can stack each column of H into a tall vector $\tilde{h}$, and equation (24) can be rewritten as:

$$\max_{\tilde{h}} \frac{\tilde{h}^H D \tilde{h}}{\tilde{h}^H B \tilde{h}} \quad (25)$$

where D and B are M(v+L1)×M(v+L+1) block diagonal matrices with $\bar{S}^* \bar{S}^T$ and $\bar{S}^* P_{\bar{X}^H \perp} * \bar{S}^T$ as each block, respectively. Since $B^{-1}D$ has M repeated largest eigenvalues, $\tilde{h}$ can be any of the corresponding eigenvectors. In any case, the H reconstructed from f has only one non-zero column vector, which is equal to $h_{opt}$ in equation (16). This shows that the MIMO filter will degenerate into a MISO filter with weight vector identical to $w_{opt}$ in equation (17). Thus, it shows that although a third embodiment using MIMO space-time linear filter and multi-channel Viterbi equalizer could be used, the use of a MISO space-time linear filter 200 and a single-channel Viterbi equalizer 210 as in the second embodiment is sufficient under the optimization criterion of equation (15).

As mentioned with reference to the first embodiment of the present invention, it is well known in the art that a Viterbi equalizer is optimal only when the input noise is Gaussian and white. However, in the second embodiment of a digital receiver according to the present invention, neither conditions are met. After the space-time filtering, the intermediate signal y contains desired signal $h_{opt}\bar{S}$ and disturbance e. When the thermal noise level is low (i.e., high SNR), the residual CCI level in e is still comparable to the noise level and hence it cannot be ignored. Because of the slow Rayleigh fading assumption, CCI plus noise is not Gaussian distributed within a burst. Instead, it is a combination of a Bernoulli distribution (from CCI data symbols $z_k$) and a Gaussian distribution (from thermal noise $n_k$). Also, because of the temporal correlation of the CCI and the temporal coloring from linear filter 200, disturbance e is not white.

One approach to partially alleviate this problem is to use a whitening filter prior to the Viterbi equalizer. To justify the use of a temporal whitening filter in this non-Gaussian environment, again we study the pairwise error probability of the nearest neighbor of a Viterbi equalizer. Using the same notation as in equation (18), single-channel Viterbi equalizer 210 makes an erroneous decision when the decision variable D(s, Δs) is less than zero, where D(s, Δs) is defined as:

$$D(s, \Delta s) = \|x - (S + \Delta S)^T h\|^2 - \|x - S^T h\|^2 \quad (26)$$
$$= \|\Delta S^T h + Z^T c + n\|^2 - \|Z^T c + n\|^2$$
$$= p^H Q p$$

where $p = [h^T c^T n^T]^T$, and:

$$Q = \begin{bmatrix} \Delta S^* \Delta S^T & \Delta S^* Z & \Delta S^* \\ Z^H \Delta S^* & 0 & 0 \\ \Delta S^T & 0 & 0 \end{bmatrix} \quad (27)$$

We derive the pairwise error probability between s and s+$\Delta$s conditioned on Z to be:

$$P_\Theta(s, \Delta s | Z) = \int_{D<0} f_{D|Z}(D) dD = \sum_{\lambda_i < 0} \prod_{\lambda_i \neq \lambda_j} \frac{1}{1 - \frac{\lambda_j}{\lambda_i}} \quad (28)$$

where $\lambda_i$'s are eigenvalues of MQ, and M=E(pp$^H$). Finally, we can average $P_e$ (s,$\Delta$s|Z) over all possible sequences of z, whose elements are i.i.d. Bernoulli random variables, to obtain the pairwise error probability of a Viterbi equalizer in the presence of CCI and colored noise:

$$P_\Theta(s, \Delta s) = \frac{1}{\text{No. of } Z_i} \sum_{z_j} P_\Theta(s, \Delta s | Z_i). \quad (29)$$

We are interested in knowing whether a temporal whitening filter improves the performance of single-channel Viterbi equalizer 210 when the disturbance $Z^T c+n$ is colored, non-Gaussian distributed. The covariance matrix R of the disturbance is $E(Z^T c+n)(Z^T c+n)^H$, where the expected value is taken over Z and n since c remains constant within a TDMA burst. Therefore, we can apply a whitening filter $R^{-\frac{1}{2}}$ to x, where $R = R^{-\frac{1}{2}} R^{H/2}$, and the decision variable $D(s, \Delta s)$ becomes:

$$D(s, \Delta s) = \left\|R^{\frac{1}{2}}(x - (S + \Delta S)^T h)\right\|^2 - \left\|R^{\frac{1}{2}}(x - S^T h)\right\|^2. \quad (30)$$

Because R is a function of c, it is difficult to find an analytical expression of $P_e$ (s, $\Delta$s) similar to equations (28) and (29). Thus, we resort to numerical evaluation of the following form:

$$P_\Theta(s, \Delta s) = \frac{1}{\text{No. of } Z_i} \sum_{z_i} \int_h \int_c P_\Theta(s, \Delta s | h, c, Z_i) dc dh \quad (31)$$

where $$P_\Theta(s, \Delta s | h, c, Z_i) = Q\left(\frac{\left\|R^{\frac{1}{2}}\Delta S^T h\right\|^2 + 2Re(h^H \Delta S^* R^{-1} Z_i^T)c^2}{2\sqrt{h^H \Delta S^* R^{-1} R_n R^{-1} \Delta S^T h}}\right) \quad (32)$$

Figure 7:
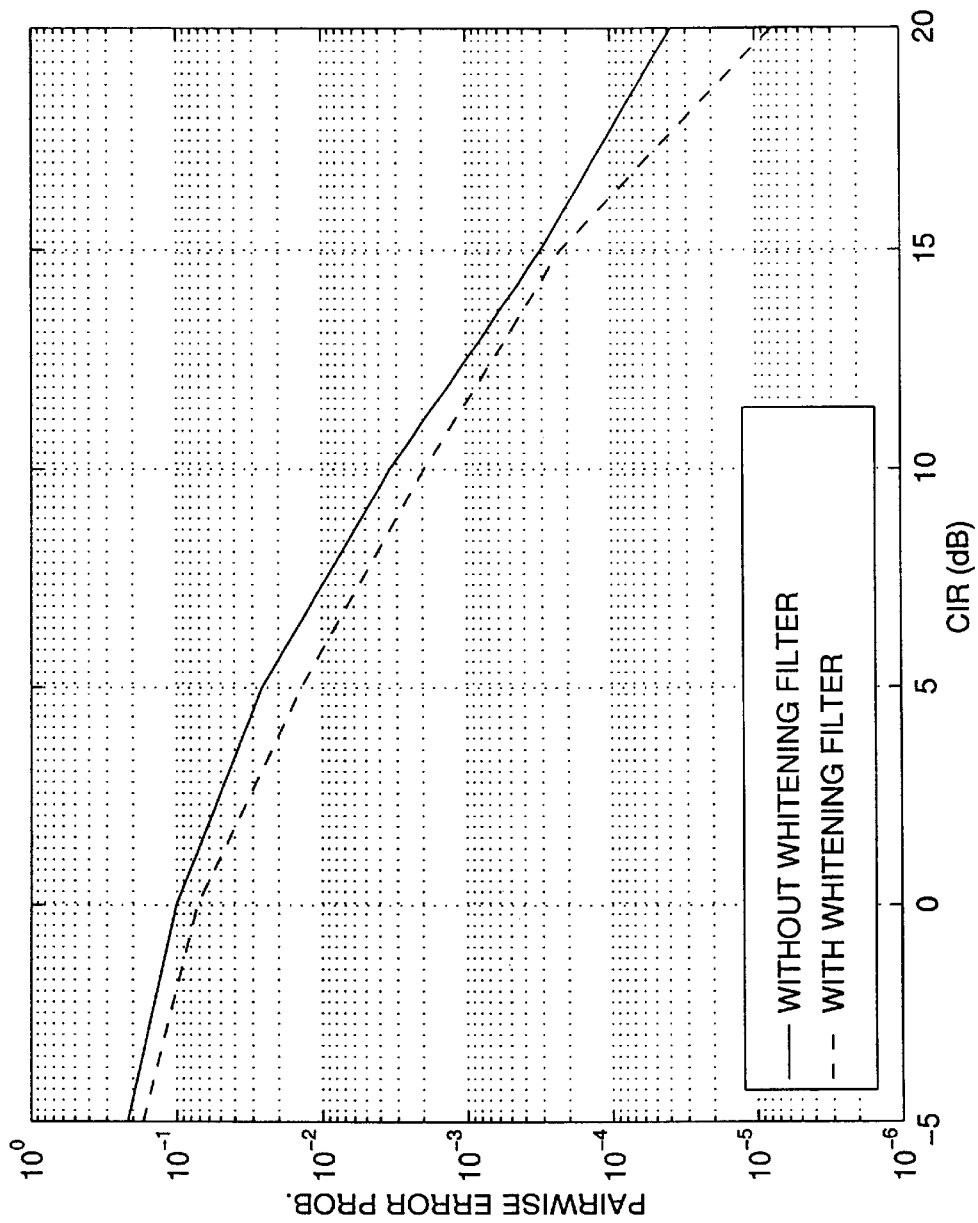
FIG. 7 is plot of the pairwise error probability to the nearest neighbor versus carrier-to-interference-ratio for a two-stage digital receiver according to a second embodiment of the present invention, with and without a whitening filter preceding the second-stage Viterbi equalizer.

FIG. 7 shows the pairwise error probability of the nearest neighbor when $\Delta$s is chosen to be all zeros except for one $\pm 2\sigma_s$ in one of the elements. The comparison demonstrates an approximate 1.5 dB improvement at $10^{-3}$ error rate when a $R^{-\frac{1}{2}}$ whitening filter is applied for a colored non-Gaussian disturbance. In a practical situation, the covariance matrix of the disturbance must be estimated and the length of the temporal whitening FIR filter must be limited. Therefore, the expected benefit form the practical whitening filter would be smaller than that shown in FIG. 7. In any case, the complexity of single-channel Viterbi equalizer 210 grows exponentially with respect to the length of the whitening filter, producing a tradeoff between the complexity of single-channel Viterbi equalizer 210 and the gain in BER obtained by applying the whitening filter in the presence of CCI and noise.

The second embodiment of the present invention was also tested in a GSM scenario with GMSK modulation based on the ETSI standard. The simulations used a reduced Typical Urban 6-ray channel model and 50km/hr mobile speed (TU50) for the multipath fading and delay parameters. One desired signal and one interferer were assumed to impinge on a two-element antenna array (i.e., M=2) from random angles within a 120 degree sector, each with 30 degree angle spread. The SNR was set at 20 dB.

Figure 8:
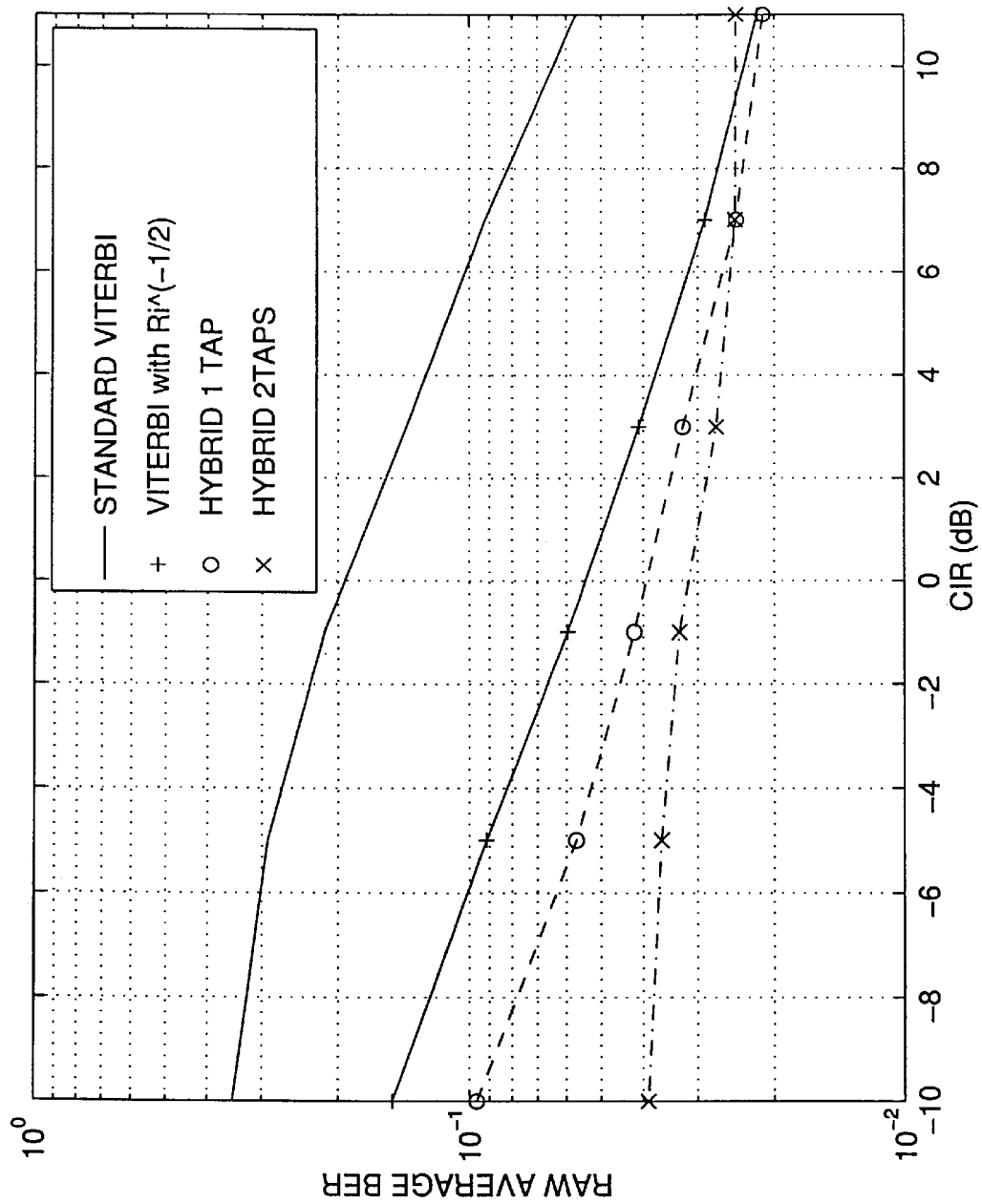
FIG. 8 is plot of the simulated raw BER performance versus carrier-to-interference-ratio for a standard multi-channel Viterbi equalizer; a multi-channel Viterbi equalizer preceded by a spatial whitening filter; a 1 time tap, two-stage digital receiver according to a second embodiment of the present invention; and a 2 time tap, two-stage digital receiver according to a second embodiment of the present invention.

A first simulation determined the raw average BER performance versus CIR of four different digital receiver structures, and the results are plotted in FIG. 8. The first simulated digital receiver was a standard multi-channel Viterbi equalizer which calculated its branch metric recursively based on the Euclidean distance between sequences. The second digital receiver was a multi-channel Viterbi equalizer preceeded by a spatial whitening filter having a matrix that was derived from the sampled spatial covariance matrix $R_i$ of CCI plus noise using the residue $E=X-\hat{H}\hat{S}$, where $\hat{H}$ is the least squares channel estimate using the known training symbols $\hat{S}$. When CCI is strong, this digital receiver suffers from an inaccurate $R_i$ due to severe channel estimation error. The third and fourth digital receivers were the two-stage digital receivers according to the second embodiment of the present invention without noise-whitening filters and with one and two time taps (i.e., L=0 and L=1), respectively.

FIG. 8 illustrates the substantial improvement in BER of the two-stage receivers according to the second embodiment of the present invention compared to the BER performance the other two receivers. Notice that there is a crossover point between the lower two curves. This illustrates the tradeoff between the power and the coloring of the disturbance e. When CCI is strong (i.e., low CIR), a MISO space-time filter with longer time taps can reduce more disturbance power $\sigma_e^2$. This provides more gain than loss from the coloring of the disturbance.

Figure 9:
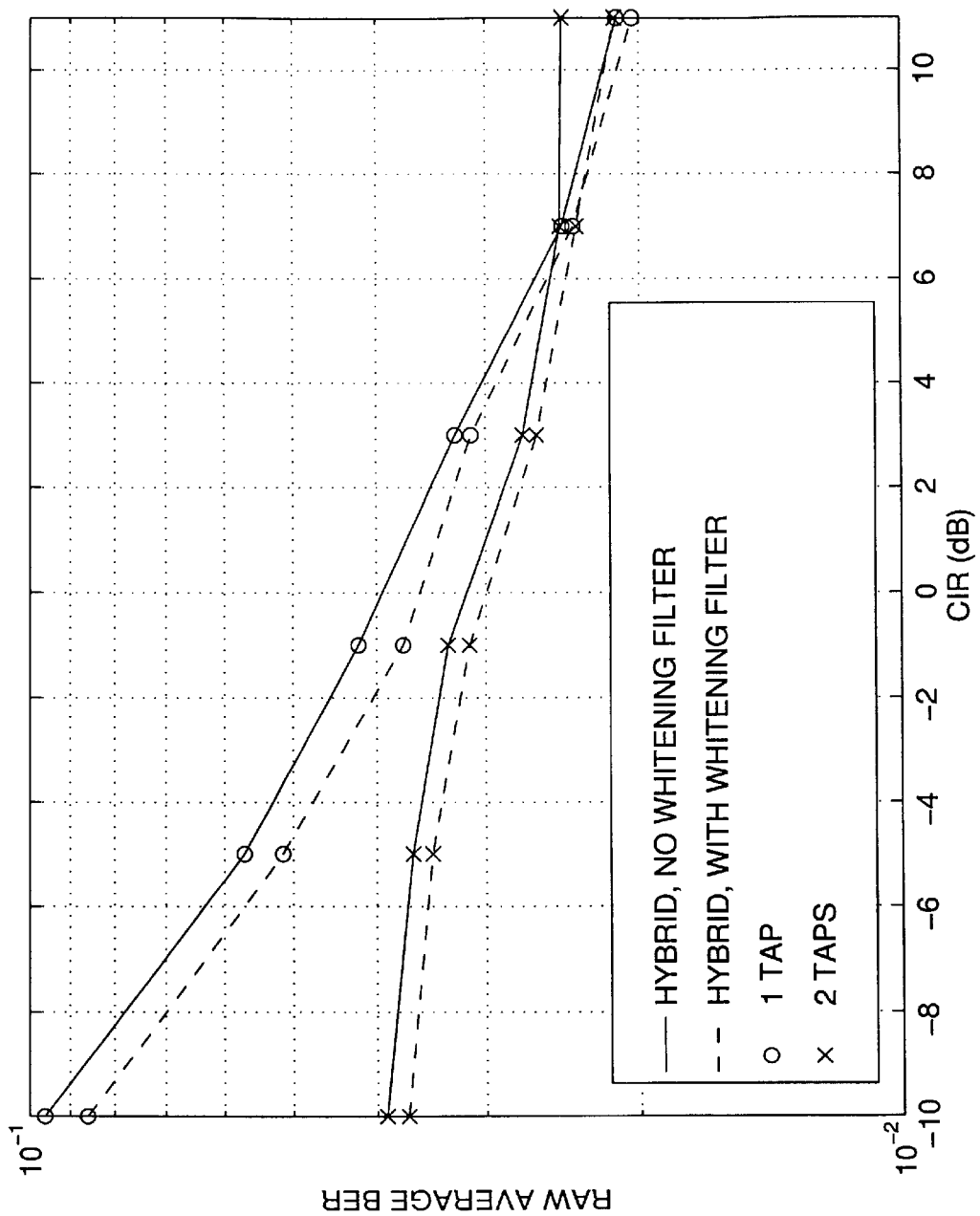
FIG. 9 is plot of the simulated raw BER performance versus carrier-to-interference-ratio for 1 and 2 time tap, two-stage digital receivers according to a second embodiment of the present invention, with and without whitening filters preceding the second-stage Viterbi equalizers.

However, when CCI is weak (i.e., high CIR), the amount of $\sigma_e^2$ reduction by a longer time tap MISO space-time linear filter 200 is not large enough to compensate for the coloring it introduces. In any case, if the major concern is a system which suffers from low CIR, such as in a low frequency-reuse-factor system, a MISO space-time linear filter 200 with longer time taps provides a good performance over a wide range of CIR. FIG. 9 demonstrates the use of whitening filters prior to the single-channel viterbi equalizers 210 in the two simulated digital receivers according to the second embodiment of the present invention. The temporal correlation function $R_e(k)$ can be estimated using e in equation (14). Spectral factorization, which is well-known in the art, can be used to obtain a stable and causal whitening filter for the simulation. Considering the complexity of the Viterbi equalizer, the length of the FIR whitening filter was limited to 2 taps. As suggested above, the whitening filters provide about 1 dB gain at 3% raw average BER.

The present invention provides a method and apparatus for a two-stage, space-time digital receiver for providing accurately estimated symbols corresponding to desired symbols from a received signal containing the desired symbols, CCI, and ISI. Although the invention has been described under specific simplified conditions, many extensions to the baseline scheme exist. For example, the invention has been described for conditions including only one desired user and one interferer. However, the method of the present invention could easily be extended to a multi-user, multi-interferer scenario. Additionally, the invention has been described assuming binary-valued symbols. However, the method of the present invention could easily be used with other, more complex symbols. For example, the symbols could be multi-valued for pulse-amplitude modulation (PAM) or complex-valued for quadrature amplitude modulation (QAM). Although additional techniques (such as I-Q processing for QAM) would need to be applied, these techniques are well-known in the art and would not preclude the use of a digital receiver according to the present invention. Furthermore, although the invention has been described for use in a TDMA wireless cellular network, the present invention is very flexible and could be used in many other packet-based communications applications where the received signal is corrupted by both CCI and ISI, such as wireless local loop systems.

Many modifications of the embodiments of the digital receiver described herein are possible without exceeding the scope of the present invention, and many of these would be obvious to those skilled in the art. For example, the components of a digital receiver according the present invention could be implemented with many circuit and software techniques, including dedicated DSP firmware or general-purpose microprocessors. In addition, certain details of the present description can be changed in obvious ways without altering the function or results of the essential ideas of the invention. For example, the invention has been described assuming symbol-rate sampling (i.e., one sample per AFE per symbol period). However, the method of the present invention could easily be used with over-sampling (i.e., N samples per AFE per symbol period, where N is a positive integer). Therefore, although the invention has been described in connection with particular embodiments, it will be understood that this description is not intended to limit the invention thereto, but the invention is intended to cover all modifications and alternative constructions falling within the spirit and scope of the invention as expressed in the appended claims and their legal equivalents.

We claim:

1. In a digital receiver comprising a linear filter and a Viterbi equalizer, a method for providing estimated symbols corresponding to desired symbols from a received signal comprising the desired symbols, co-channel interference (CCI), and inter-symbol interference (ISI), the method comprising the steps of:
   a) coupling the received signal through a plurality of spatially-separated antennas to corresponding inputs of the linear filter;
   b) passing the received signal through the linear filter to provide an intermediate signal with substantially reduced CCI content and substantially equivalent ISI content compared to that of the received signal; and
   c) passing the intermediate signal through the Viterbi equalizer to substantially remove the ISI and provide the estimated symbols;
   wherein the step of passing the received signal through the linear filter further comprises the steps of:
      i) determining a first channel estimate from the received signal;
      ii) convolving known training symbols with the first channel estimate to obtain a reference signal;
      iii) applying minimum mean-square error (MMSE) criteria to the difference between the intermediate signal and the reference signal to compute coefficients for the linear filter; and
      iv) filtering the received signal in accordance with the coefficients to produce the intermediate signal.

2. The method according to claim 1 wherein the step of passing the intermediate signal through the Viterbi equalizer further comprises the steps of:
   i) determining a second channel estimate from the intermediate signal; and
   ii) Viterbi equalizing the intermediate signal in accordance with the second channel estimate to provide the estimated symbols.

3. The method according to claim 2 wherein the step of Viterbi equalizing the intermediate signal is preceded by a step of passing the intermediate signal through a temporal whitening filter.

4. The method according to claim 3 wherein both channel estimates are computed using a least squares technique.

5. The method according to claim 1 further comprising the step of jointly determining coefficients for both the linear filter and the Viterbi equalizer by maximizing a signal-to-interference-plus-noise ratio (SINR) objective function.

6. The method according to claim 5 wherein the step of passing the intermediate signal through the Viterbi equalizer is preceded by a step of passing the intermediate signal through a temporal whitening filter.

7. In a digital receiver comprising a linear filter and a Viterbi equalizer, a method for providing estimated symbols corresponding to desired symbols from a received signal comprising the desired symbols, co-channel interference (CCI), and inter-symbol interference (ISI), the method comprising the steps of:
   a) providing samples of the received signal from a plurality of spatially-separated antennas to respective inputs of the linear filter;
   b) passing the received signal samples through the linear filter to produce intermediate signal samples with substantially reduced CCI content and substantially equivalent ISI content compared to that of the received signal samples; and
   c) passing the intermediate signal samples through the Viterbi equalizer to substantially remove the ISI and provide the estimated symbols;
   wherein the step of passing the received signal samples through the linear filter further comprises the steps of:
      i) estimating a first set of estimated channel vectors from the received signal samples;
      ii) convolving known training symbols with the first set of estimated channel vectors to obtain reference signal samples;
      iii) applying minimum mean-square error (MMSE) criteria to the difference between the intermediate signal samples and the reference signal samples to compute a weight matrix W of coefficients for the linear filter; and
      iv) filtering the received signal samples in accordance with W to produce the intermediate signal samples.

8. The method according to claim 7 wherein the linear filter is a multiple-input-multiple-output (MIMO), space-time, finite-impulse-response (FIR) filter.

9. The method according to claim 8 wherein the step of passing the intermediate signal samples through the Viterbi equalizer comprises the steps of:
   i) estimating a second set of estimated channel vectors from the intermediate signal samples; and ii) Viterbi equalizing the intermediate signal samples in accordance with the second set of estimated channel vectors to provide the estimated symbols.

10. The method according to claim 9 wherein the Viterbi equalizer is a multi-channel space-time Viterbi equalizer.

11. The method according to claim 10 wherein the step of computing the weight matrix of coefficients is performed by solving the equation $W=\hat{H}\hat{S}X^H(XX^H)^{-1}$ where $\hat{H}$ is a space-time matrix of the first set of estimated channel vectors, $\hat{S}$ is a space-time matrix of the known training symbols, and $X$ is a space-time matrix of the received signal samples.

12. The method according to claim 11 wherein both sets of estimated channel vectors are computed using a least squares technique.

13. The method according to claim 12 wherein the step of Viterbi equalizing the intermediate signal samples is preceded by a step of passing the intermediate signal samples through a temporal whitening filter.

14. The method according to claim 12 incorporating symbol-rate sampling.

15. The method according to claim 7 further comprising a step of jointly calculating an optimal weight vector $w_{opt}$ and an optimal estimated channel vector $h_{opt}$ such that the intermediate signal samples satisfy an optimization of an objective function with respect to an error term, wherein the error term is a difference between the intermediate signal samples and reference signal samples containing ISI.

16. The method according to claim 15 wherein the step of passing the received signal samples through the linear filter comprises the step of filtering the received signal samples in accordance with $w_{opt}$.

17. The method according to claim 16 wherein the step of passing the intermediate signal samples through the Viterbi equalizer comprises the step of Viterbi equalizing the intermediate signal samples in accordance with $h_{opt}$.

18. The method according to claim 17 wherein the linear filter is a multiple-input-single-output (MISO), space-time, finite-impulse-response (FIR) filter.

19. The method according to claim 18 wherein the Viterbi equalizer is a single-channel Viterbi equalizer.

20. The method according to claim 17 wherein the objective function is given by:

$$SINR=\|h^T\overline{S}\|^2/e^T\|^2=\|h^T\overline{S}\|^2/\|w^T\text{fheight}\overline{X}-h^T\overline{S}\|^2$$

where e is the error term, h is an estimated channel vector, $\overline{S}$ is a space-time matrix of known training symbols, $\overline{X}$ is a space-time matrix of the received signal samples, $[h^T\overline{S}]^T$ is a vector of the reference signal samples, and $[w^T\overline{X}]^T$ is a vector the intermediate signal samples.

21. The method according to claim 20 wherein the optimization of the objective function is described by:

$$\max_{w,h} \frac{\|h^T\overline{S}\|^2}{\|w^T\overline{X} - h^T\overline{S}\|^2}$$

such that the resulting w and h are $w_{opt}$ and $h_{opt}$, respectively.

* * * * *